US007053765B1

(12) United States Patent
Clark

(10) Patent No.: US 7,053,765 B1
(45) Date of Patent: May 30, 2006

(54) ACTIVE SECURITY SYSTEM

(75) Inventor: Ruel Ross Clark, Bluffdale, UT (US)

(73) Assignee: Provider Services, Inc., Bluffdale, UT (US)

( * ) Notice: Subject to any disclaimer, the term of this patent is extended or adjusted under 35 U.S.C. 154(b) by 0 days.

(21) Appl. No.: 10/979,985

(22) Filed: Nov. 2, 2004

(51) Int. Cl.
*G08B 29/00* (2006.01)

(52) U.S. Cl. .................. 340/506; 340/531; 340/538.11

(58) Field of Classification Search ................ 340/506, 340/517, 521, 531, 628, 538.11, 538.12; 455/428; 370/242, 244
See application file for complete search history.

(56) References Cited

U.S. PATENT DOCUMENTS

| 2,520,007 | A | 8/1950 | Hochgraf |
| 3,163,856 | A | 12/1964 | Kirby |
| 3,470,553 | A | 9/1969 | Hyde |
| 3,803,579 | A | 4/1974 | Compton |
| 4,012,732 | A | 3/1977 | Herrick |
| 4,331,953 | A | 5/1982 | Blevins et al. |
| 4,682,153 | A | 7/1987 | Boozer et al. |
| 5,027,383 | A | * | 6/1991 | Sheffer | ........................ 379/39 |
| 5,576,689 | A | 11/1996 | Queen |
| 5,686,886 | A | 11/1997 | Stensney |
| 5,686,910 | A | 11/1997 | Timm et al. |
| 6,134,303 | A | * | 10/2000 | Chen | ........................... 379/49 |
| 6,351,212 | B1 | 2/2002 | Lynch |
| 2002/0177428 | A1* | 11/2002 | Menard et al. | ............. 455/404 |
| 2003/0184436 | A1 | 10/2003 | Seales et al. |
| 2004/0189460 | A1* | 9/2004 | Heaton et al. | .............. 340/500 |

* cited by examiner

*Primary Examiner*—Toan N. Pham
(74) *Attorney, Agent, or Firm*—Thorpe North & Western LLP

(57) ABSTRACT

A system and method is disclosed for actively maintaining security of a premises. The method can include the operation of establishing a data link between a local security controller within the premises and a monitoring station located remote from the premises. A security data packet can be transmitted between the local security controller and the monitoring station at a predefined periodic rate. A check of the premises can be initiated if the monitoring station does not receive the security data packet within a predetermined time frame. Selected electronic neighborhood watch subscribers can be notified if the monitoring station does not receive the security data packet within the predetermined time frame.

35 Claims, 3 Drawing Sheets

ACTIVE SECURITY SYSTEM

BACKGROUND

The present invention relates generally to home and business security systems.

Home and business security systems are widely available on the market today. These systems are typically used to increase the peace of mind of the owner or occupier of a structure. Most systems operate by relying on sensors to detect an intrusion. In order for a security system to operate as designed, the sensors should be performing optimally. Once a security system is installed, however, most people fail to take the time to test the security system sensors. Sensors relying on batteries, such as smoke alarms, can easily run out of power and become inoperable. Even sensors connected to the electrical grid can fail to function and/or become reduced in capability. Without a method for automatically detecting and tracking the functioning of each detector within an alarm system, the system can easily become non-functional and its operation can be diminished with age. A system configured to continuously test the functioning of each detector within an alarm system is needed to ensure the operation of the alarm system.

When an alarm condition is detected, a typical security system functions by using a connection to the Public Switched Telephone Network (PSTN) to communicate the condition to an outside source. Such a communication, however, can be easily defeated. By simply cutting the telephone connection outside the premises, those seeking to gain entrance to a home or building can do so without any outside source being contacted. Many security systems also rely on a connection to the power grid. A determined criminal can simply disconnect power to a home or building to gain access.

Even when security systems function properly, they can still be fairly ineffective. When the outside source is contacted by an alarm system, the outside source normally takes a substantial amount of time to respond. A response time of 15 minutes or more to a business or residential alarm is typical. In that time, a fire can quickly spread out of control, or a thief can easily gain entrance to the home or building and make off with much of the valuable contents inside.

SUMMARY

A system and method is disclosed for actively maintaining security of a premises. The method can include the operation of establishing a data link between a local security controller within the premises and a monitoring station located remote from the premises. A security data packet can be transmitted between the local security controller and the monitoring station at a predefined periodic rate. A check of the premises can be initiated if the monitoring station does not receive the security data packet within a predetermined time frame. Selected electronic neighborhood watch subscribers can be notified if the monitoring station does not receive the security data packet within the predetermined time frame.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Figure 1:
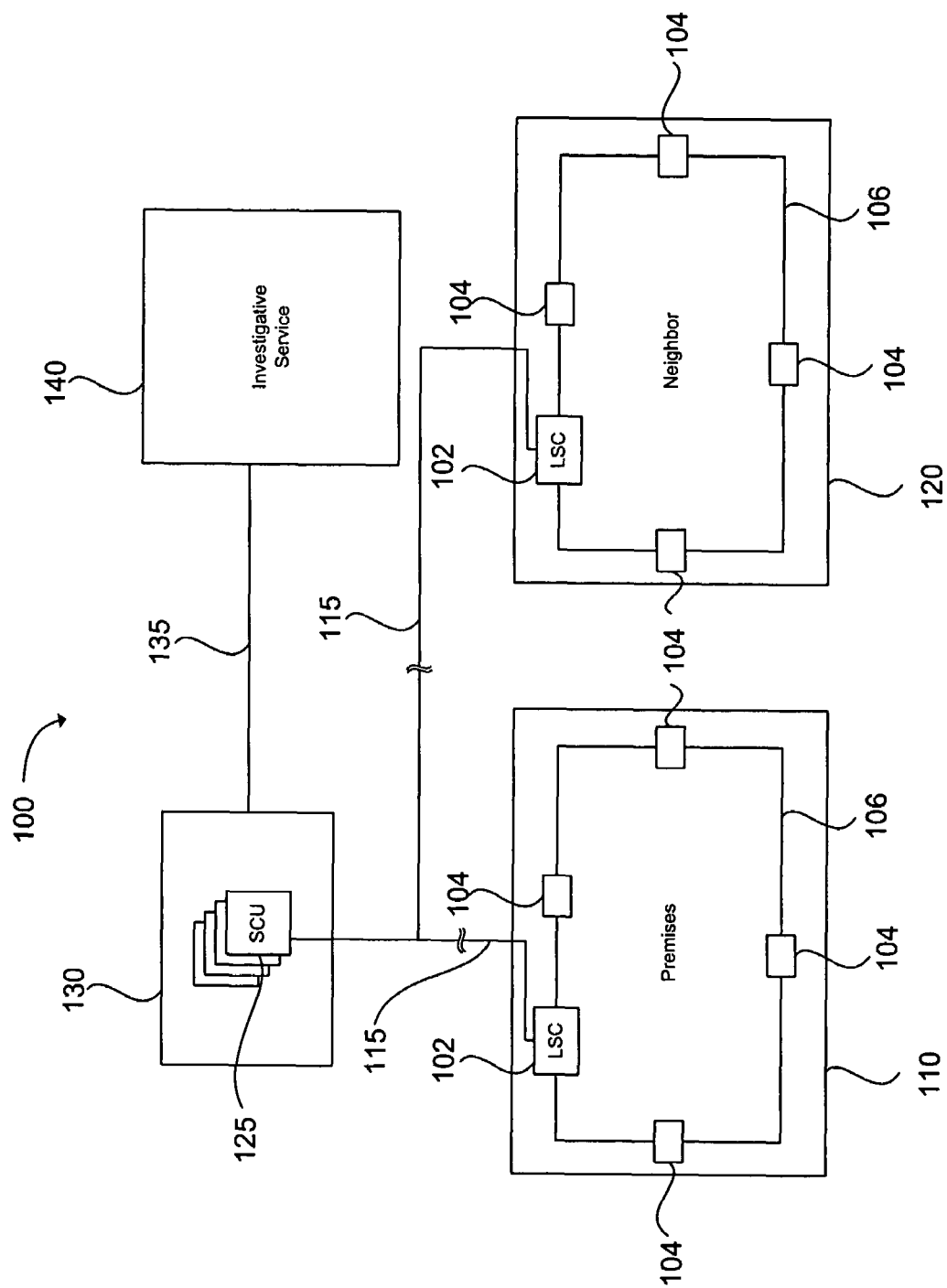
FIG. 1 is a block diagram of an active security system in accordance with an example embodiment of the present invention.

As illustrated in FIG. 1, an active security system 100 is shown in an example implementation in accordance with the invention. The active security system comprises a local security controller 102 located within a premises 110. The local security controller can be monitored by a subscriber control unit 125 over a security digital subscriber line (SECDSL) 115. The SECDSL connection can be achieved over a plain old telephone service (POTS) connection between the premises and a central office 130 of the public switched telephone network or in any useful location. The SECDSL connection will be described in more detail below.

Plain old telephone service, also known as the public switched telephone network, is essentially unchanged from the design implemented at the turn of the twentieth century. Because the same basic design has been used for so long, it has allowed the telephone system to become arguably the most reliable network in the world. The public switched telephone network even has its own backup power, allowing phone operation during blackouts. A typical POTS connection consists of two copper wires strung between a premises and a central telephone office. The two copper wires, known as tip and ring, have traditionally been used for voice communications. With the advent of the Internet, however, new technologies have allowed the same two copper wires to be used for a variety of other purposes, including sending and receiving broadband data.

The Federal Communication Commission (FCC) has promulgated rules in the Telecommunications Act of 1996 that requires incumbent local exchange carriers (ILEC) (the local telephone company) to share certain telecommunications resources on the public switched telephone network with competitive local exchange carriers. One of the rules enables a competitive local exchange carrier to use telephone lines of an ILEC, in conjunction with the ILEC, to offer telecommunications services to customers of the ILEC. Such line sharing arrangements allows the competitive local exchange carrier to provide digital subscriber line (DSL) services over the same loop that is used by the ILEC for voice communications. Similarly, the SECDSL connection can use the telephone lines of an ILEC to provide a connection between the premises 110, 120 and the central office 130.

Previous alarm systems have usually incorporated the POTS connection due to its high level of reliability in connecting the alarm to an external security service. The prior art alarm systems are typically designed to call the external security service whenever an alarm condition is present. A determined intruder, however, can simply cut or disable the external POTS connection before intruding on the premises. For example, an intruder could ground the POTS tip and ring wires, effectively breaking the POTS connection. When the intruder breaks into the premises and the alarm condition is activated, the external security service cannot be contacted if the POTS connection is first disabled. Thus, previously designed alarm systems are no more fool proof than the doors and windows in the premises, all of which can be broken by the determined intruder.

In contrast, the active security system 100 does not rely on passive notification of an external security service. Rather, the active security system takes advantage of the new technologies designed for the POTS lines in the information age. Instead of relying on the POTS line to be continuously functioning, the active security system can be used to transmit a security data packet at a predetermined periodic rate between a premises 110 and a monitoring station 130. If the security data packet is not received at the monitoring station within a predetermined amount of time, then an alarm condition can be raised and sent to an external investigative service 140. Rather than relying on the POTS connection, a premises using the active security system can be protected during any disruption in the communication line.

To achieve the active security system, the subscriber control unit 125 can be connected to the ILEC at the telephone company's central office 130. Each subscriber control unit can be connected to a plurality of local security controllers 102 to form the SECDSL connection with each of the premises 110, 120. In one embodiment, each subscriber control unit can be connected to 16 local security controllers. A plurality of subscriber control units can be located at each central office. For example, 64 subscriber control units can be placed in one or more racks and located at a central office, enabling 1,024 local security controllers to be connected.

In another embodiment, the SECDSL connection can also be accomplished using a wireless connection between the subscriber control unit 125 and a plurality of local security controllers 102. For example, cell phones or wireless communications such as the IEEE 802.16 standard or developments made by the WiMAX Forum™ can be used to transit data packets between each local security controller and a subscriber control unit.

Because each local security controller 102 has a SECDSL connection 115 to the subscriber control unit 125 at the central office 130, a variety of new opportunities are available with the active security system 100. Security systems have long struggled with the vexing problems of false alarms and the lengthy time for security personnel to respond to a real alarm. The SECDSL connection can enable the active security system 100 to be part of an electronic neighborhood watch program. The electronic neighborhood watch program allows neighbors 110 and 120 to monitor each others houses electronically. For example, a local security controller can be programmed with information relating to one or more neighbors 120 who also have an active security system. When an alarm condition at a local security controller at a first house 110 is activated, then the alarm data can be sent to the subscriber control unit at the central office. The subscriber control unit can forward the alarm condition of the local security controller at the first house to the neighbor's 120 local security controller 102, enabling neighbors to check on each others' houses when an alarm condition is activated. The cost of surveillance can be reduced by enabling a greater reliance on neighbors watching out for each other. If the alarm condition at the first house is caused by a door ajar, the neighbor can be notified and can check to see if anyone is home and alert a security service of false alarms.

If the alarm condition is caused by a serious alarm condition, such as a smoke alarm at the first house 110, the neighbor 120 can quickly determine if they should call the fire department or if it was a false alarm. Saving even a few minutes in response time can be critical in fires. The reduced response time through the use of an electronic neighborhood watch can allow property, pets, and even lives to be saved. The electronic neighborhood watch can enable quicker responses and reduce the number of false alarms which typically occur with security systems. It can be predetermined which alarm conditions are sent to one or more members of the electronic neighborhood watch, which are sent to an external investigative service, or both.

The active security system 100 can function by configuring each subscriber control unit 125 to transmit a security data packet to each connected local security controller 102 at the predetermined periodic rate on a signal centered at a first non-interfering frequency over a POTS connection. The subscriber control unit can receive a response from each connected local security controller on a signal centered at a second non-interfering frequency over the same POTS connection. It should be apparent to one skilled in the art that a data link can be established between the subscriber control unit and each local security controller by transmitting a first security data packet from the subscriber control unit to each local security controller, or by transmitting the first security data packet from each local security controller to the subscriber control unit. The frequency at which the data is transmitted over the POTS connection can be selected such that it will interfere minimally with the local voice and data communications on the POTS connection.

The bandwidth from 300 Hz to 3300 Hz on a POTS line is typically used for voice communications. An asynchronous digital subscriber line (ADSL), employing the popular carrierless amplitude/phase (CAP) standard, generally uses the 25 KHz to 160 KHz band on the POTS line for upstream communications (from the premises to the central office). In one embodiment, the first and second non-interfering frequencies used in a SECDSL connection can be located above the voice communications band (3300 Hz) and below the upstream band used for ADSL (25 KHz). For example, the first frequency may be 18 KHz and the second frequency may be 22 KHz. Alternatively, the data may be transmitted in one of the channels of an ADSL modem.

Transmitting the signals centered at the first and second non-interfering frequencies in this unused bandwidth on the POTS line can allow the subscriber control unit to effectively communicate with each local security controller with very little interference to other POTS functions, such as voice communications and data transmitted over a DSL. Communication in the unused bandwidth can also allow the subscriber control unit 125 and each local security controller 102 to communicate when the POTS line is on-hook, off-hook, and in use for voice or data communications. Thus, the active security system 100 can be able to effectively communicate between the premises and an off-site location substantially all of the time whether or not a phone at the premises is in use. Local telephone service for voice communications with an ILEC may not be necessary to accommodate a SECDSL connection.

The security data packet sent from the subscriber control unit 125 can comprise data necessary to determine if each connected local security controller 102 is effectively communicating and whether any alarm conditions are present at a local security controller. In one embodiment, the security data packet can include a subscriber seven digit telephone number, subscriber alarm codes, and alarm coordinate locations. The seven digit telephone number can be used by the subscriber control unit to identify the specific local security controller. Alarm coordinate locations can be used to determine the location of the alarm within a specific residence, such as a broken window, or a smoke alarm in an upstairs bedroom. Global Positioning Satellite (GPS) coordinates can be included in the data packet to enable emergency services personnel to quickly locate the premises. The amount of data in the security data packet can be determined according to customer needs. For example, a local security controller at a medium sized business office may be more complex, requiring more data to be sent.

The security data packet can also contain information concerning selected electronic neighborhood watch members. An active security system subscriber can select specific neighbors to be within their electronic neighborhood watch program. In one embodiment, three different active security system subscribers can be selected to be in an electronic neighborhood watch. The seven digit telephone numbers of the three subscribers, along with any alarm codes of those subscribers, can be included in the security data packet.

The security data packet can be made substantially secure by including miscellaneous data used in scrambling, including variable or random embedded sequence strings. Cyclic redundancy codes can also be included within the security data packet. Scrambling and/or encrypting the security data packet can help to ensure that the security data packet cannot be tampered with. When scrambling of the security data packet is implemented, even a determined intruder with technologically advanced tools for receiving and transmitting the security data packet can be thwarted from interfering with the security data packet.

In one embodiment, the subscriber control unit 125 can be programmed to repeatedly send the security data packet to each connected local security controller 102 at a predetermined rate. The subscriber control unit can send the security data packets serially over the POTS tip and ring conductors comprising the SECDSL connection 115 to each local security controller. Each local security controller can receive the security data packet, which can include a substantially correct date, time, and subscriber identifier, such as the seven digit phone number. The local security controller can be programmed to interpret the security data packet. The local security controller can then respond to the security data packet received from the subscriber control unit and send a local input security data packet back to the subscriber control unit on the second non-interfering frequency.

The subscriber control unit 125 can receive each local input security data packet and analyze it for alarm data. The subscriber control unit can be programmed to determine if one or more alarm conditions in the input security data packet are within predetermined parameters. A master clock in the subscriber control unit can be used to compare the time in the incoming local input security data packets with the master clock to be certain the data is new. If the time recorded by the local security controller in the local input security data packet is off by more than a predetermined amount, or if the local input security data packet is not received within the predetermined amount of time, a line disconnected alarm can be sent to the investigative service 140 and all of the electronic neighborhood watch subscribers identified in the last local input security data packet. If the electronic neighborhood watch subscribers are not connected to the same subscriber control unit, the local input security data packet or a selected portion of the security data packet containing alarm and identification information can be sent over a communication line to the other subscriber control units located within the central office 130. The subscriber control unit can then continue servicing all of the connected local security controllers 102.

In another embodiment, the subscriber control unit 125 can request and receive each local input security data packet and analyze it for alarm data. The local security controller 102 may determine that alarms are not within predetermined limits and this data can be included in the input security data packet. The subscriber control unit can be programmed to respond to the alarm data in the input security data packet as previously discussed.

In one embodiment, the subscriber control unit 125 can send a security data packet to each connected local security controller 102 at a rate of at least once a second. When a local input security data packet is received from a local security controller which had alarm conditions reported in a previous local input security data packet, the subscriber control unit repeats the process in the previous paragraph until the investigative service 140 or the subscriber within the premises 110 sends an acknowledgment that the problem is being addressed. The acknowledgement can be sent by entering a code on a keypad at the local security controller or via some other method. The subscriber control unit can then flag the local security controller and skip notification of alarm conditions until an all clear indication is sent to the subscribe control unit for the specific local security controller.

The subscriber control unit 125 can include a pause control configured to enable test connections to be made without causing alarms. Disconnect jumpers for each POTS connection can enable the insertion of a test device to monitor proper operation of the subscriber control unit and the local security controller. A carrier detect indicator can be used to verify proper transmission connections. The pause control can put the subscriber control unit in an inactive condition for a predetermined amount of time while the test device is connected.

Figure 2:
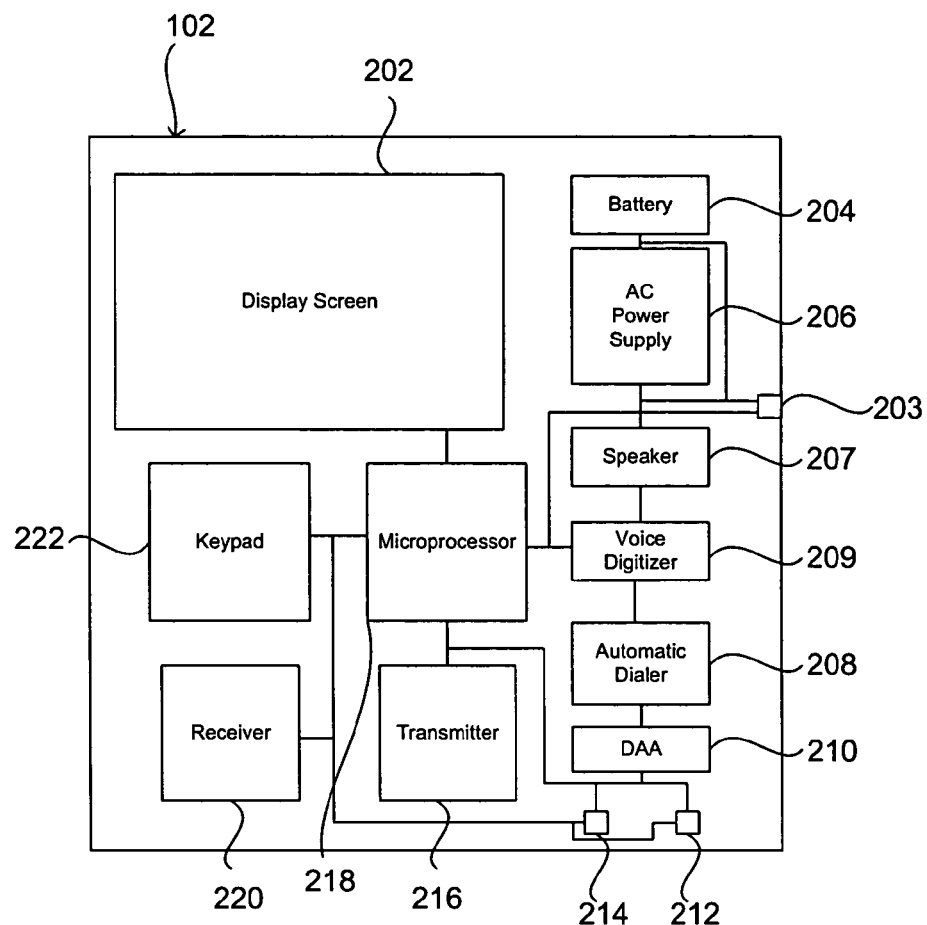
FIG. 2 is a block diagram of an example embodiment of a local security controller in accordance with the present invention.

As understood by persons skilled in the art to which this invention pertains, the local security controller 102 and the subscriber control unit 125 can be configured using a variety of hardware, software, and firmware. In one embodiment, the local security controller can be configured as shown in FIG. 2. The local security controller can comprise a receiver 220 configured to receive the security data packet transmitted by the subscriber control unit 125 (FIG. 1). The receiver can be electrically connected to a telephone jack 214, a computer jack 212, and a microprocessor 218 configured to monitor the security data packet sent from the subscriber control unit. The microprocessor can also be used to monitor security sensors. The microprocessor may contain an electrically erasable programmable read only memory (EEPROM) which can be used to store set-point values for each sensor to determine proper operation and alarm conditions. This will be discussed in further detail below.

The telephone jack can be a modular RJ-11 connector. The computer jack 212 can be an RJ-11 or RJ-45 connector. The microprocessor can be a central processing unit, such as an X86 processor, a power PC processor, or the like. It may also be a digital signal processor, a microcontroller, a field programmable gate array (FPGA), a reconfigurable FPGA such as a Xilinx processor, or any other processor capable of analyzing the security data packet.

A keypad 222 can be electrically connected to the microprocessor and used for, among other things, programming the local security controller, activating the security system, and triggering an all-clear after an alarm condition has been activated. The keypad may be numeric or alphanumeric. The subscriber can use the keypad to enter alarm code numbers. Programmed alarm code numbers can be used to turn certain sensors off. The length of time the sensors are off can be programmed for certain sensors such as doors used during the day and windows that are to be opened. Special one digit codes can be used to allow exit from the premises, with the alarm being reactivated for the door sensor within a set amount of time. One or more separate keypads (not shown) may be placed at entrance locations outside the premises and electrically connected to the microprocessor. The external keypads can be used to enter external entrance codes for entrance to the premises when the alarm system is on. The alarm can be reactivated for the door sensor within a set time of entrance into the premises.

A display screen 202 can be electrically connected to the microprocessor and configured to display the status of the local security controller during programming and operation of the active security system 100 (FIG. 1). The display screen may be a liquid crystal display, a field emission display, an organic light emitting diode display, a thin film transistor display, a plasma display, or any other type of display capable of showing the status of the local security controller.

A transmitter 216 can be electrically connected to the telephone jack 214, computer jack 212, and microprocessor 218. The transmitter can be configured to transmit the local input security data packet to the subscriber controller unit 125 (FIG. 1). An automatic dialer 208 and data access arrangement (DAA) module 210 can be electrically connected to the telephone jack and microprocessor. The automatic dialer and DAA module can allow full access to the public switched telephone network over normal dial up methods and when answering incoming calls when so instructed by the subscriber.

A voice digitizer 209 can allow selectable pre-recorded voice messages to be announced over an external speaker 207 and over the telephone line to the subscriber and emergency personnel. Voice messages can be prerecorded and stored using the keypad 222. The voice messages can be made concerning the type of sensor having an alarm condition, the location of the sensor, and so on. For example, when a smoke alarm is activated a prerecorded voice message can be initiated at the local security controller 102 stating that a smoke alarm in the upstairs bedroom has an alarm condition. Pre-recorded voice messages can also be recorded concerning selected electronic neighborhood watch members. A voice message may state "a smoke alarm has been activated at the Jones' house in the downstairs family room." The prerecorded voice message may also include location information, such as an address or GPS coordinates.

The local security controller 102 can be powered using an AC power supply 206. The power supply can be used to recharge a battery 204. In one embodiment, the battery can be configured to power the local security controller for at least 24 hours in the event of a power outage. The AC power supply and battery can also be configured to power external devices connected to the local security controller through an external sensor connector 203.

Figure 3:
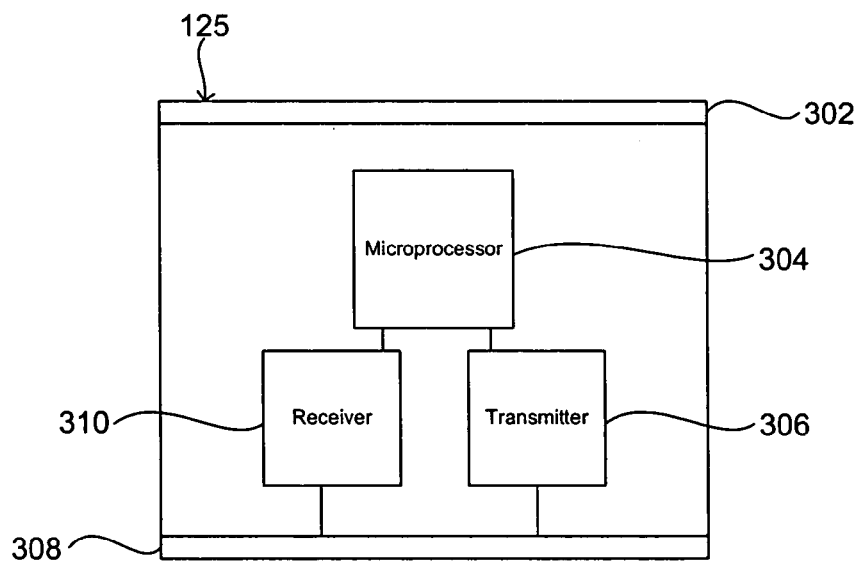
FIG. 3 is a block diagram of an example embodiment of a subscriber controller unit in accordance with the present invention.

The subscriber control unit 125 can include a microprocessor 304, as shown in FIG. 3. The subscriber control unit can be connected to one or more local security controllers 102 (FIG. 1), as previously discussed. The microprocessor can be programmed to send a security data packet to the one or more local security units using a transmitter 306. A receiver 310 can be used to receive the local input security data packet sent from the local security controller. The local input security data packet can be stored in an EEPROM within the processor (not shown). The processor can scan the memory and analyze each packet for any alarm indicators included in any of the local input security data packets.

A card rear edge connector 308 can be used to connect to the tip and ring connections to the one or more local security controllers 102 (FIG. 1). The connector can also include connections to program the microprocessor, for a data transfer bus between cards and racks, an output for a direct line to the investigative surface 130 (FIG. 1), and for power from a power supply card (not shown). A pause control (not shown) can be connected to a card front edge connector 302 to allow test connections without causing alarms at the local security controllers. The card front edge connector can also include disconnect jumpers for each POTS connection and carrier detect indicators for each connection to one or more the local security controllers.

Returning to FIG. 1, the active security system 100 can further include sensors 104 which can be placed throughout the premises 110 as needed to secure the premises from unwanted entry, and from internal problems. For example, the sensors may be placed to monitor doors and windows through which an intruder can gain access to the premises. Motion detectors may be placed within the premises. The sensors may also include smoke alarms, fire alarms, and moisture sensors to detect if water breaks have occurred. For example, a moisture sensor can be placed beneath a washing machine. If a malfunction with the washing machine or the water supply causes flooding, then an alarm condition can be sounded within the premises and also at one or more neighbors 120 which have been selected as an electronic neighborhood watch member. Various smart home sensors, such as light and appliance automation sensors, motor temperature and current sensors, sump water level detectors, vibration sensors, temperature and vapor sensors for furnace rooms, water heater rooms, gas and oil fired steam plant rooms, and water quality and pH sensors can also be connected to the local security controller. The local security controller can be used to monitor the condition of any appliance or system which a subscriber may want observed.

The local security controller 102 can be connected to one or more of the sensors 104 through the external sensor connector 203 (FIG. 2). In one embodiment, the sensors can be connected to the local security controller using a single connection means, such as a cable 106. The cable may be a two conductor cable. The cable can also be constructed to be capable of sending signals over a longer distance, such as a twisted shielded pair cable. The cable can be used to supply power to each of the sensors as well as to enable the sensors to transmit their condition to the local security controller. In another embodiment, the sensors can communicate with the local security controller using a wireless communications standard, such as IEEE 802.11 or 802.15.

In one embodiment, the sensors 104 can transmit analog or digital signals relating to their operational status to the local security controller 102. The keypad 222 (FIG. 2) can enable an installer or subscriber to enter operational setpoints peculiar to the subscriber's sensors. The local security controller can monitor the set points and determine the operational status of one or more of the sensors attached to the cable 106. For example, standard smoke detectors typically used throughout the world include a test point that provides a variable voltage proportional to air particulates, such as smoke, that enter the detector. A smoke detector sensor can utilize this test point to report the quality of the air passing through the smoke detector to the local security controller. Power can also be provided to the standard detector using the cable by means of a small package the size of a nine volt battery that connects to the same snap type battery connectors used in most sensors. Thus, the condition of the smoke alarm can be monitored at the local security controller. If the smoke detector sensor voltage in the smoke alarm begins to operate outside of a predetermined range, an alarm condition can be reported and the operation of the smoke detector can be checked and fixed, if necessary. Other types of sensors and detectors connected to the local security controller can be similarly monitored to ensure that they are operating within operational parameters. The local security controller can also be in communication with sensors which transmit digital signals relating to their operational status.

The local security controller 102 at the premises 110 can be programmed to be "always on". In this embodiment, the local security controller can be programmed to be on during predetermined times during the day during which the premises is not occupied or is desired to be protected. For example, the local security controller can be programmed to be active from 11:00 PM at night until 7:00 AM the next morning and from 8:30 AM until 5:30 PM while the occupants are gone to work. If the occupants are home during that time, they can manually turn the local security controller off for a set amount of time. After that set amount of time, the controller will automatically revert to the "always on" schedule. This allows the active security system to be useful without relying on an occupant or subscriber to manually arm the system each time the premises are vacated. Alternatively, the local security controller can also be programmed to only be active when manually armed, as typical alarm systems are.

An example prototype active security system has been configured with a local security controller 102, as shown in FIG. 2, comprising a Hantronix 1HDM40416L-4-L30S LCD display screen 202, an Eagle Pitcher CF-12V1.3 battery 204, a PHIHONG PSC10A-1505 wall mount AC power supply 206, a Panasonic WM-R30B speaker 207, a National Semiconductor DS3695 automatic dialer 208, a Windbond Electronics ISD2560S voice digitizer 209, a Cermetek CH1840 automatic dialer 210, an Analog Devices AD654 transmitter 216, a Motorola MC68HC912B32 microprocessor 218, a National Semiconductor LMC568 receiver, a Grayhill 88AB2-143 keypad 222, and various connectors and standard electronic and mechanical components used to assemble and interconnect the prototype parts.

An example prototype subscriber control unit 125, as shown in FIG. 3, has been configured comprising a Motorola MC68HC912B32 microprocessor 304, an Analog Devices AD654 transmitter 308, and a National Semiconductor LMC568 receiver 310. Various connectors are used for connecting a plurality of local security controllers 102 (FIG. 1) to the subscriber controller unit, connecting the subscriber controller unit to the security investigative service 140 (FIG. 1), interconnecting a plurality of subscriber control units, and for receiving power from an external power supply card. Miscellaneous standard electronic and mechanical components are also used to assemble and interconnect the prototype parts.

Figure 4:
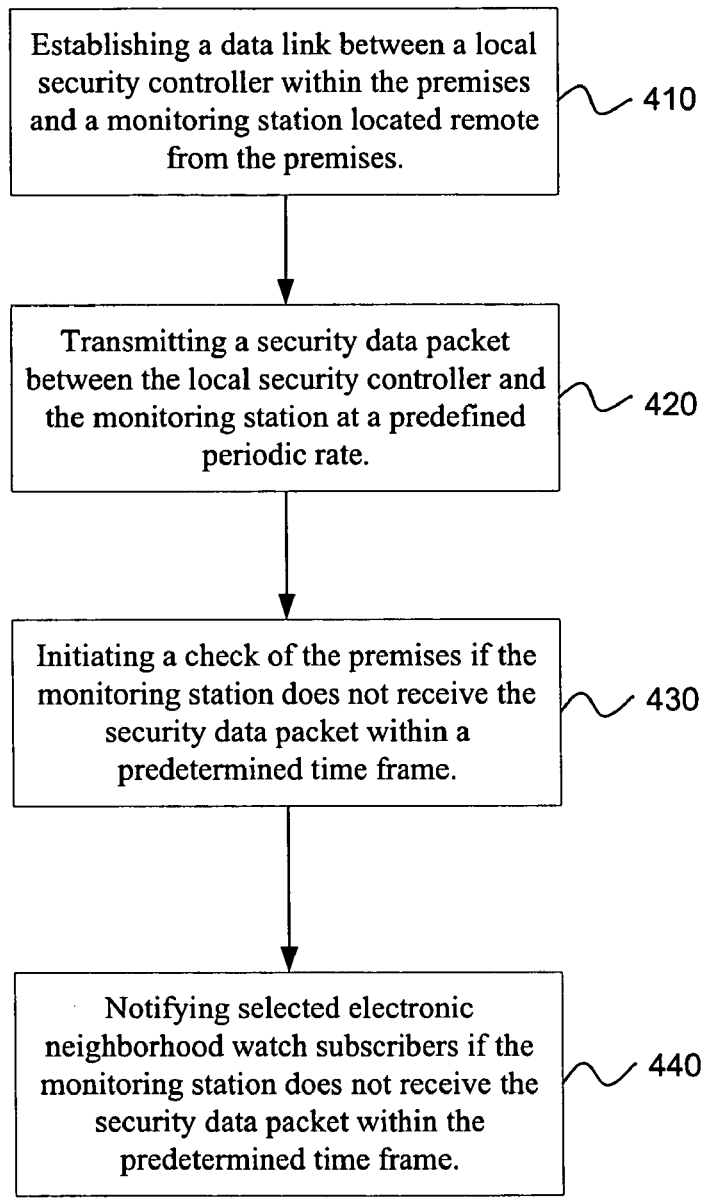
FIG. 4 is a flowchart depicting a method for actively maintaining security of a premises in accordance with an example embodiment of the present invention.

Another aspect of the active security system includes a method for actively maintaining security of a premises, as shown in the flowchart of FIG. 4. The method can include the operation of establishing a data link between a local security controller within the premises and a monitoring station located remote from the premises, as shown in block 410. The data link can be configured as a security digital subscriber line (SECDSL) between the local security controller and the monitoring station. The monitoring station can be a telephone central office, where a subscriber control unit can be used to connect the local security controller to the public switched telephone network.

A further operation can involve transmitting a security data packet between the local security controller and the monitoring station at a predefined periodic rate, as shown in block 420. The security data packet can comprise an output security data packet sent from the subscriber control unit to one or more local security controllers. The output security data packet can be sent over a POTS line between the local security controller and the subscriber control unit. The POTS line can serve as the SECDSL connection.

The output security data packet can be transmitted as a digital or analog signal which can be modulated to transmit over the SECDSL connection by altering the phase, frequency, or amplitude of the signal. For example, frequency shift keying can be used to modulate the signal onto a carrier frequency. The output security data packet sent to each local security controller can contain a small amount of data, such as less than 100 bytes of data. The subscriber control unit can send an output security data packet to one or more subscriber control units at the predefined periodic rate. In one embodiment, the output security data packet can be sent once a second. Therefore, the bandwidth necessary to transmit the output security data packet can be quite narrow. The packet can be sent using a digital or analog signal centered at a frequency of greater than 4 KHz. By transmitting the output security data packet at a frequency greater than 4 KHz, the security data packet can be sent with substantially little interference to voice communications on the POTS line. Thus, the SECDSL connection can operate substantially all the time, no matter whether the subscriber's phone is in use, on-hook, or off-hook.

In one embodiment, the local security controller can receive the output security data packet from the subscriber control unit. The local security controller can respond with a local input security data packet. The local input security data packet can contain data necessary to determine if each connected local security controller is effectively communicating and whether any alarm conditions are present at a local security controller, as previously disclosed.

Another operation can involve initiating a check of the premises if the monitoring station does not receive the security data packet within a predetermined time frame, as shown in block 430. The local input security data packet can be received at the subscriber control unit. If the local input security data packet is not received, an alarm condition can be reported after a predetermined amount of time. The subscriber control unit can also monitor the local input security data packet to determine if an alarm condition is reported by the security data packet. If an alarm condition is reported, either by the local input security data packet or the lack of security data packet at the subscriber control unit, the subscriber control unit can send a notification of the alarm condition to an investigative service. The investigative service can have a connection to the subscriber control unit through the public switched telephone network, ensuring a reliable connection between the subscriber control unit and the investigative service.

A further operation can include notifying selected electronic neighborhood watch subscribers if the monitoring station does not receive the security data packet within the predetermined time frame, as shown in block 440. The subscriber control unit can also send a notification of any alarm conditions to selected electronic network neighborhood members. A prerecorded message at the electronic network neighborhood members' local security controllers can alert them to the alarm condition. The prerecorded message can identify the type of alarm and its source. For example, the message can identify the alarm condition as a smoke alarm in an upstairs bedroom at the Jones' house. One or more neighbors would be able to take appropriate action to determine if smoke was present, and call the fire department or an emergency number. Members of the electronic neighborhood watch can respond quicker and more efficiently than the investigative service. Subscribers can determine which alarm conditions should be reported to the investigative service, which should be reported to electronic neighborhood watch members, and which should be reported to both.

The active security system 100 (FIG. 1) can also use other communication means to effectively communicate security data packets between the local security controller 102 and the subscriber control unit 125. For example, a computer (not shown) can be connected to the local security controller through an RJ-11 or RJ-45 connector 212. The communication means can then be directed through the computer, using a broadband Internet connection such as DSL or Cable, or a dial-up modem connection connected to the computer. Software can be used to effectively communicate the security data packet between the local security controller 102 and the monitoring station 130 at a predetermined periodic rate.

The public switched telephone network has evolved over the last century as one of the most reliable networks in the world. The network is much more reliable than wireless and cellular telephone systems. Security systems can rely on the network's reliability in reporting an alarm condition. A determined intruder, however, can easily disconnect a POTS connection from a premises. An active security system can be implemented by sending a security data packet between a local security controller at the premises and a subscriber control unit, the security of the POTS connection can be closely monitored. Any disruption in the signal can be quickly reported. Sending the security data packet through a security digital subscriber line over the POTS connection can further enhance the reliability of the active security system. The SECDSL connection can allow the security data packet to be received and transmitted with minimal disruption to voice and data communications over the POTS connection. The SECDSL connection can also enable the establishment of an electronic neighborhood watch, which will allow neighbors to quickly respond to any alarm conditions. Thus, a secure, inexpensive, security system allowing a nearly instantaneous response to alarm conditions can now be implemented. A quicker response will allow property and lives to be saved in the event of a fire. Intruders will think twice before entering a home with an active security system, knowing that neighbors will be quickly notified of any intrusion or disruption in communication with the local security controller.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for actively maintaining security of a premises, comprising the steps of:
    establishing a security digital subscriber line connection over a public switched telephone network line between one or more local security controllers and a subscriber control unit located at a monitoring station located remote from the premises;
    transmitting a security data packet between the local security controller and the monitoring station at a predefined periodic rate at a frequency that will not substantially interfere with ordinary use of public switched telephone network line for voice communications; and
    initiating a check of the premises if the monitoring station does not receive the security data packet within a predetermined time frame.

2. A method as in claim 1, wherein the step of initiating a check of the premises further comprises the step of initiating a check of the premises if the security data packet includes one or more alarm indicators.

3. A method as in claim 1, wherein the step of establishing a data link further comprises the step of establishing a bi-directional data link between the local security controller within the premises and the monitoring station.

4. A method as in claim 1, further comprising the step of locating one or more subscriber control units at a public switched telephone network central office connected through an incumbent local exchange carrier.

5. A method as in claim 1, wherein the step of transmitting a security data packet further comprises the step of transmitting an output security data packet from the subscriber control unit to the local security controller at a predefined periodic transmit rate.

6. A method as in claim 5, further comprising the step of electronically responding when the output data packet is received at the local security controller by transmitting an input security data packet to the subscriber control unit.

7. A method as in claim 6, further comprising the step of monitoring the input security data packets sent from one or more local security controllers over the security digital subscriber line to the subscriber control unit, wherein the subscriber control unit monitors the input security data packets for one or more conditions selected from the group consisting of an alarm condition, a delayed time, an unexpected data packet format, and one or more missing input security data packets.

8. A method as in claim 7, further comprising the step of transmitting the output data packet when the one or more conditions occur, wherein the output data packet is configured to notify one or more locations of the condition, the locations selected from the group consisting of a premises transmitting the input security data packet having one or more conditions, one or more selected electronic network neighborhood members, and an investigative service.

9. A method as in claim 5, further comprising the step of transmitting the output security data packet and input security data packet on a signal centered at an output frequency greater than 3300 Hertz.

10. A method as in claim 5, further comprising the step of receiving the output security data packet at the one or more local security controllers, wherein each of the local security controllers is configured to interpret the output security data packet and respond by transmitting an input security data packet from the local security controller to the subscriber control unit.

11. A method as in claim 10, further comprising the step of con figuring the input security data packet to comprise one or more pieces of information selected from the group consisting of a date, a time, a subscriber identifier code, and one or more alarm conditions.

12. A method as in claim 11, further comprising the step of receiving the input security data packet at the subscriber control unit, wherein the subscriber control unit is configured to receive the input security data packet from one or more local security controllers and to determine if the one or more alarm conditions in the input security data packet are within predetermined parameters.

13. A method as in claim 1, wherein the step of initiating a check of the premises further comprises the step of initiating a check of the premises according to one or more predetermined alarm conditions as decided by a security system subscriber.

14. A method as in claim 1, wherein the step of initiating a check of the premises further comprises the step of initiating a check of the premises when an alarm indicator is received at the subscriber control unit indicating an alarm condition consisting of one or more sensors selected from the group consisting or a door sensor, a window sensor, a motion sensor, a smoke alarm sensor, and a fire alarm sensor.

15. A method as in claim 1, wherein the predefined periodic rate is less than five seconds.

16. A method as in claim 1, wherein the predefined periodic rate is less than 15 minutes.

17. A method as in claim 1, further comprising the step of configuring the local security controller to include one or more sensors selected from the group consisting of a smoke alarm, a fire alarm, a door sensor, a window sensor, a motion detector, a moisture sensor, a lawn moisture sensor, a thermostat, a sump water level detector, a refrigeration monitor, a vibration sensor, and a water quality sensor.

18. A method as in claim 17, further comprising the step of connecting the one or more sensors to the local security controller using a single cable.

19. A method as in claim 18, further comprising the step of supplying power through the single cable to the one or more sensors from a power supply located at the local security controller.

20. A method as in claim 18, further comprising the step of supplying power through the single cable to the one or more sensors from a battery located at the local security controller.

21. A method as in claim 17, further comprising the step of connecting the one or more sensors to die local security controller using a wireless communications standard selected form the group consisting of IEEE 802.11 and IEEE 802.15.

22. A method as in claim 17, further comprising the step of testing the local security controller by entering a test code at the local security controller to test the local security controller and the one or more sensors.

23. A method as in claim 17, further comprising the step of monitoring an operating condition of the one or more sensors at the subscriber control unit and reporting a fault condition when any of the one or more sensors' condition is outside predetermined parameters.

24. A method as in claim 1, further comprising configuring the local security controller to have a voice messaging system and speaker which can be used to advise residents of the premises of an alarm condition at the resident's premises or selected electronic neighborhood watch subscribers' premises.

25. A method as in claim 1, further comprising notifying selected electronic neighborhood watch subscribers if the monitoring station does not receive the security data packet within the predetermined time frame.

26. A method as in claim 25, wherein the step of notifying selected electronic neighborhood watch subscribers further comprises the step of notifying selected electronic neighborhood watch subscribers if the security data packet includes one or more alarm indicators.

27. A method as in claim 25, wherein the step of notifying selected electronic neighborhood watch subscribers further comprises the step of notifying selected electronic neighborhood watch subscribers according to one or more predetermined alarm conditions as decided by a security system subscriber.

28. A method as in claim 25, wherein the step of notifying selected electronic neighborhood watch subscribers further comprises the step of notifying selected electronic neighborhood watch subscribers when an alarm indicator is received at the subscriber control unit indicating an alarm condition consisting of one or more sensors selected from the group consisting of a door sensor, a window sensor, a smoke alarm sensor, a fire alarm sensor, a moisture sensor, and a sump water level detector.

29. A system for actively maintaining security of a premises, comprising:
a local security controller located on a premises and configured to communicate with one or more sensors used for monitoring security at the premises;
a security digital subscriber line configured to transmit a security data packet at a predefined periodic rate over a public switched telephone network between the local security controller;
a subscriber control unit located remote from the premises, wherein the security data packet is transmitted over the security digital subscriber line at a frequency above a voice communication band on the public switched telephone network; and
the subscriber control unit configured to analyze the security data packet transmitted at the predefined periodic rate for one or more alarm conditions and notify an investigative service in communication with the subscriber control unit if the security data packet is not received at the subscriber control unit within a predetermined period.

30. The system of claim 29, wherein the security digital subscriber line is configured to operate as a bi-directional data link between the subscriber control unit and the local security controller.

31. The system of claim 29, wherein the subscriber control unit is further configured to notify the investigative service if the security data packet contains one or more alarm conditions.

32. The system of claim 29, wherein the local security controller is further configured to receive an output security data packet transmitted from the subscriber control unit.

33. The system of claim 32, wherein the output security data packet includes one or more alarm conditions from one or more neighbor's local security controller.

34. The system of claim 29, wherein the subscriber control unit further comprises a pause control configured to enable a test module to be connected to the subscriber control unit for testing of the subscriber control unit and local security controller from the subscriber control unit.

35. The system of claim 29, further comprising one or more sensors in communication with the local security controller selected from the group of sensors consisting of a smoke alarm, a fire alarm, a door sensor, a window sensor, a motion detector, a moisture sensor, a lawn moisture sensor, a thermostat, a sump water level detector, a refrigeration monitor, a vibration sensor, and a water quality sensor.

* * * * *